(12) United States Patent
Lu et al.

(10) Patent No.: US 10,637,857 B2
(45) Date of Patent: Apr. 28, 2020

(54) METHOD AND DEVICE FOR REGISTERING BASED ON AUTHENTICATING DEVICE

(71) Applicant: FEITIAN TECHNOLOGIES CO., LTD., Beijing (CN)

(72) Inventors: Zhou Lu, Beijing (CN); Huazhang Yu, Beijing (CN)

(73) Assignee: FEITIAN TECHNOLOGIES CO., LTD., Beijing (CN)

( * ) Notice: Subject to any disclaimer, the term of this patent is extended or adjusted under 35 U.S.C. 154(b) by 306 days.

(21) Appl. No.: 15/857,598

(22) Filed: Dec. 28, 2017

(65) Prior Publication Data
US 2018/0145979 A1    May 24, 2018

Related U.S. Application Data

(63) Continuation of application No. PCT/CN2016/096211, filed on Aug. 22, 2016.

(30) Foreign Application Priority Data

Sep. 7, 2015 (CN) .......................... 2015 1 0563321

(51) Int. Cl.
H04L 29/06    (2006.01)
H04L 29/08    (2006.01)
H04L 9/32    (2006.01)

(52) U.S. Cl.
CPC ........ H04L 63/0876 (2013.01); H04L 9/3271 (2013.01); H04L 63/062 (2013.01);
(Continued)

(58) Field of Classification Search
CPC .................................................. H04L 63/0876
See application file for complete search history.

(56) References Cited

U.S. PATENT DOCUMENTS 10,320,771 B2 * 6/2019 Hande ................. H04L 63/0815
2005/0132189 A1 * 6/2005 Katsube .................. G06F 21/31
713/168

(Continued)

FOREIGN PATENT DOCUMENTS

CN    101312469 A    11/2008
CN    102571693 A    7/2012
(Continued)

OTHER PUBLICATIONS

The Chinese First Examination Report of corresponding Chinese application No. 201510563321.7, dated Nov. 15, 2017.
(Continued)

*Primary Examiner* — Simon P Kanaan
(74) *Attorney, Agent, or Firm* — J.C. Patents

(57) ABSTRACT

A registering method involving an authenticating device includes: a client obtains a URI, obtains an application ID according to the URI, obtains a device registering request according to the application ID and a user identification input, and sends the request to a server; receives registering data from the server, and obtains a client data object according to a challenge value and the application ID in the registering data; hashes the client data object and the application ID to obtain a challenge parameter and an application parameter, sends registering request information combining the challenge parameter and application parameter; receives registering response information from the authenticating device, sends a key registering request combining the registering response information, client data object and session ID in the registering data to the server; and the registering is deemed successful if success information is received from the server, or is failed if otherwise.

16 Claims, 12 Drawing Sheets

(52) U.S. Cl.
CPC .......... *H04L 63/0823* (2013.01); *H04L 67/02* (2013.01); *H04L 67/146* (2013.01); *H04L 67/306* (2013.01); *H04L 67/42* (2013.01)

(56) References Cited

U.S. PATENT DOCUMENTS

| | | | | |
|---|---|---|---|---|
| 2011/0289560 | A1* | 11/2011 | Laitinen | H04L 9/3273 726/4 |
| 2012/0254935 | A1 | 10/2012 | Yato et al. | 726/1 |
| 2013/0173484 | A1* | 7/2013 | Wesby | G06Q 30/06 705/318 |

FOREIGN PATENT DOCUMENTS

| | | |
|---|---|---|
| CN | 103685311 A | 3/2014 |
| CN | 104394001 A | 3/2015 |
| CN | 104639559 A | 5/2015 |
| CN | 104639562 A | 5/2015 |
| CN | 105162785 A | 12/2015 |
| WO | WO2014/154110 | 10/2014 |

OTHER PUBLICATIONS

International Search Report of corresponding International PCT Application No. PCT/CN2016/096211, dated Nov. 18, 2016.

\* cited by examiner

METHOD AND DEVICE FOR REGISTERING BASED ON AUTHENTICATING DEVICE

CROSS-REFERENCE TO RELATED APPLICATIONS

This application is a continuation of International Application No. PCT/CN2016/096211, filed on Aug. 22, 2016, which claims priority benefit of Chinese Patent Application No. 201510563321.7, filed on Sep. 7, 2015. The disclosures of the aforementioned applications are hereby incorporated by reference in their entireties.

TECHNICAL FIELD

The present disclosure relates to the field of information security, and more particularly, to a method and a device for registering based on an authenticating device.

BACKGROUND

Great risk of online identity authentication technology based on password exists in the prior art. Password of a user can be obtained by guessing and technology such as stealing credit certificate online, network phishing, etc. If the length of a password used by a user is relatively short, or the password is a weak password which can be cracked easily, the user will be vulnerable to attacks, leading to personal information breach and even property damage. In traditional identity authentication methods, a client needs to send a password to a password library of a remote server for verification, which has the risk of being intercepted and cracked. In addition, the passwords are stored in the same remote server, hence a compromised super administrator account can leak out passwords of all users stored in the remote server.

SUMMARY

Embodiments of the present disclosure provide a method and a device for registering based on an authenticating device to overcome defects in the prior art. Identity authentication is rapidly expanding online by involving the authenticating device in the identity authentication, enhancing security for the Internet.

According to one aspect of embodiments of the present disclosure provides, a method for registering based on an authenticating device is provided, which includes:

Step S1: a client obtains a uniform resource identifier, obtains an application ID according to the uniform resource identifier, obtains a device registering request according to the application ID and a user identification input by a user, and sends the device registering request to a server;

Step S2: the client receives registering data returned by the server, and obtains a client data object according to a challenge value and the application ID in the registering data;

Step S3: the client, applies hash operation to the client data object to obtain a challenge parameter, applies hash operation to the application ID to obtain an application parameter, combines the challenge parameter and the application parameter into registering request information, and sends the registering request information to an authenticating device;

Step S4: the client, receives registering response information returned by the authenticating device, combines the registering response information, the client data object and a session ID in the registering data into a key registering request, and sends the key registering request to the server; and Step S5: the client receives information returned by the server, determines whether the received information is success information and, if yes, determines that the registering is successful, otherwise, determines that the registering is failed.

According to another aspect of embodiments of the present disclosure provides, a client for registering based on an authenticating device is provided, which includes: a first generating module, a first sending module, a first receiving module, a second generating module, a third generating module, a fourth generating module, and a first determining module, where the first generating module is configured to obtain an application ID according to the uniform resource identifier, and obtain a device registering request according to the application ID and a user identification input by a user;

the first sending module is configured to send the device registering request generated by the first generating module to the server, send registering request information generated by the third generating module to the authenticating device, and send a key registering request generated by the fourth generating module to the server;

the first receiving module is configured to receive registering data returned by the server, receive registering response information returned by the authenticating device, and receive information returned by the server;

the second generating module is configured to obtain a client data object according to a challenge value and the application ID in the registering data received by the first receiving module;

the third generating module is configured to apply hash operation to the client data object generated by the second generating module to obtain a challenge parameter, apply hash operation to the application ID in the first generating module to obtain an application parameter, and combine the challenge parameter and the application parameter into registering request information;

the fourth generating module is configured to combine the registering response information received by the first receiving module, the client data object, and a session ID in the registering data received by the first receiving module into the key registering request; and the first determining module is configured to determine whether the information received by the first receiving module is success information, and if yes, determine that the registering is successful, otherwise, determine that the registering is failed.

According to yet another aspect of embodiments of the present disclosure, a server for registering based on an authenticating device is provided, which includes: a second receiving module, a first parsing module, a fifth generating module, a sixth generating module, a first obtaining module, a seventh generating module, a verifying module, a storing module, and a second sending module, where the second receiving module is configured to receive a device registering request sent by a client, and receive a key registering request sent by the client;

the first parsing module is configured to parse the device registering request received by the second receiving module to obtain an application ID, and parse the key registering request received by the second receiving module to obtain a registering response information, a client data object, and a session ID;

the fifth generating module is configured to generate a challenge value and the session ID;

the sixth generating module is configured to combine the challenge value and the session ID generated by the fifth generating module, and the application ID obtained through the parsing by the first parsing module into registering data;

the first obtaining module is configured to obtain, from the registering response information obtained through parsing by the first parsing module, a public key in a key pair, a key identification, a certificate, and a signature result, which are generated by the authenticating device;

the seventh generating module is configured to apply hash operation to the client data object obtained through parsing by the first parsing module to obtain a first hash value, search for an application ID according to the session ID obtained through parsing by the first parsing module, apply hash operation to the application ID to obtain a second hash value, and compose verifying data according to the first hash value, the second hash value, the key identification and the public key in the key pair obtained through parsing by the first parsing module;

the verifying module is configured to perform signature verification according to the verifying data generated by the seventh generating module, and the public key in the key pair and the signature result obtained by the first obtaining module, and determine whether the signature verification is successful;

the storing module is configured to, when the authenticating module determines that the signature verification is successful, store the key identification, the public key in the key pair and the certificate obtained by the first obtaining module, and the user identification in the device registering request received by the second receiving module as a key record;

the second sending module is configured to send the registering information generated by the sixth generating module to the client, and returns error information to the client when the authentication module determines that the signature verification is failed, or send success information to the client when the storing module stores the key record.

According to yet another aspect of embodiments of the present disclosure, an authenticating device for registering based on the authenticating device is provided, which includes: a third receiving module, an eighth generating module, a ninth generating module, a signing module, a tenth generating module, and a third sending module, where the third receiving module is configured to receive registering request information sent by the client;

the eighth generating module is configured to generate a key pair, a certificate, and a key identification;

the ninth generating module is configured to obtain data to be signed according to a challenge parameter and an application parameter in the registering request information received by the third receiving module, and the key identification and a public key in the key pair generated by the eighth generating module;

the signing module is configured to use a private key in the key pair generated by the eighth generating module to sign the data to be signed and generated by the ninth generating module according to a signature algorithm to obtain a signature result;

the tenth generating module is configure to combine the public key, the length of the key identification, the key identification, the certificate generated by the eighth generating module, and the signature result obtained through signing by the signing module, into registering response information; and the third sending module is configured to send the registering response information generated by the tenth generating module to the client.

Embodiments of the present disclosure provide a method and a device for registering based on an authenticating device, in which the authenticating device participates in a process of identity authentication and stores a private key of a user therein, making it harder for cyber offenders to obtain this information. During the identity authentication, the private key will not be sent out, and after the identity has been authenticated successfully, the client will not keep any login information. Thus, fast identity authentication is realized, and security for Internet is improved.

BRIEF DESCRIPTION OF THE DRAWINGS

The technical solutions of embodiments of the disclosure are described clearly and completely in conjunction with the accompanying drawings as follows. Apparently, the described drawings are merely a part of but not all of the embodiments according to the disclosure. Based on the described drawings of the disclosure, other drawings can be obtained by those of ordinary skill in the art without any creative work.

DETAILED DESCRIPTION

The technical solutions of the embodiments of the disclosure are described clearly and completely in conjunction with the accompanying drawings as follows. Apparently, the described drawings are merely a part of but not all of the embodiments according to the disclosure. Based on the described embodiment of the disclosure, other embodiments obtained by those of ordinary skill in the art without any creative work belong to the scope of the disclosure.

Embodiments of the present disclosure provide a method and a device for registering based on an authenticating device, which are used in a system including a client, a server, and an authenticating device.

Embodiment 1

Figure 1A:
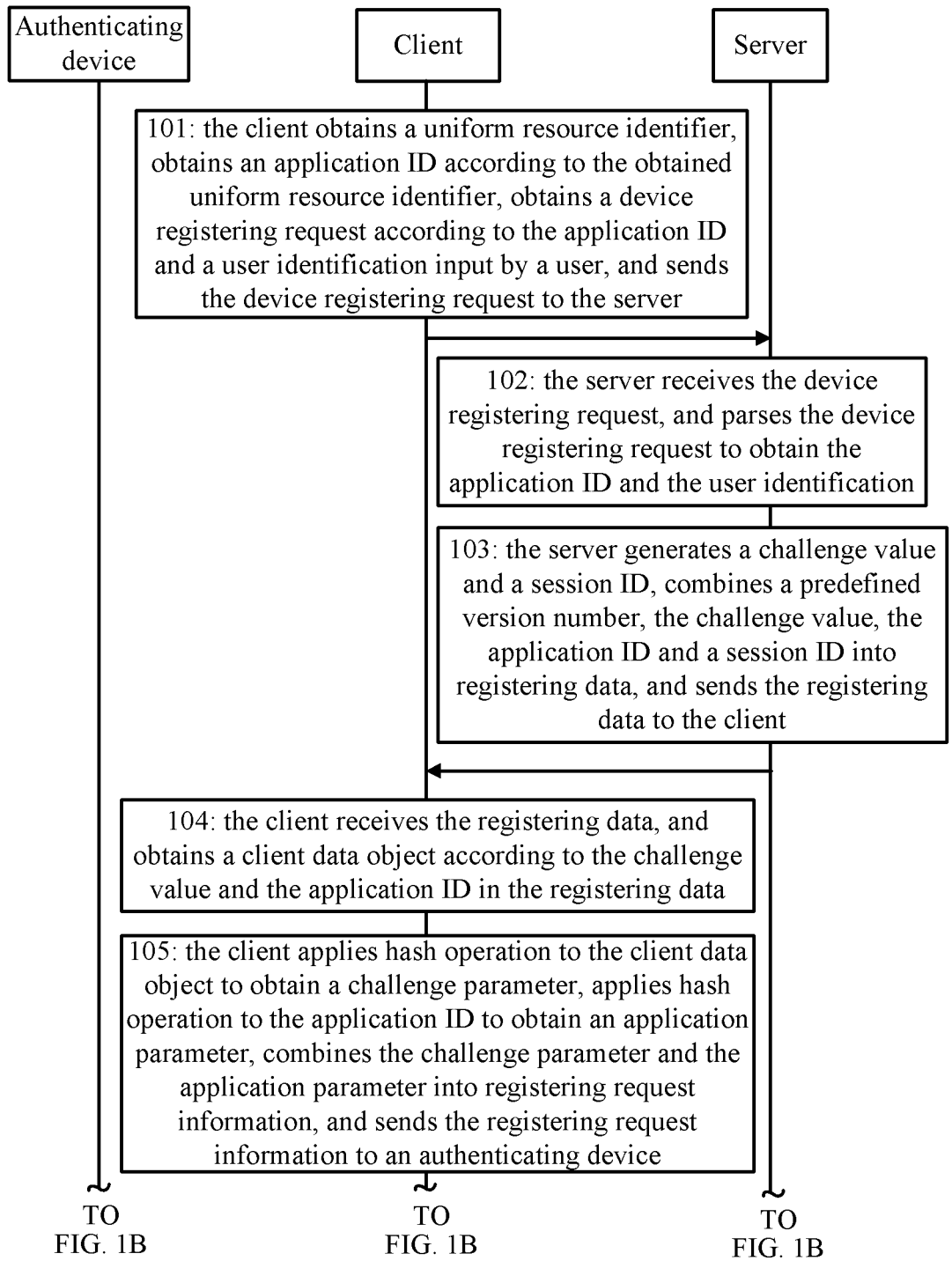
FIGS. 1A-1C are flowcharts illustrating a method for registering based on an authenticating device and provided by Embodiment 1 of the present disclosure.
Figure 1B:
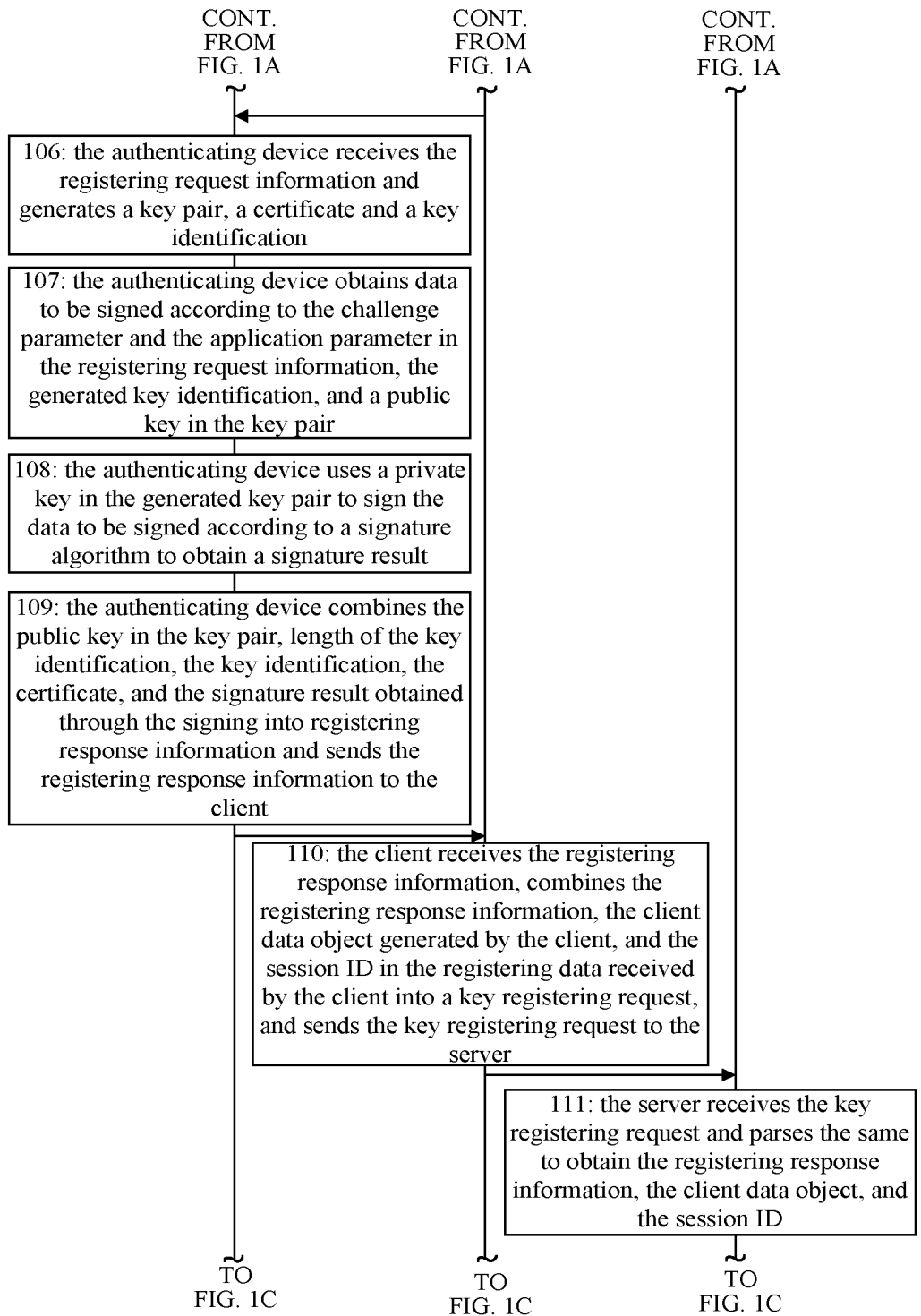
Figure 1C:
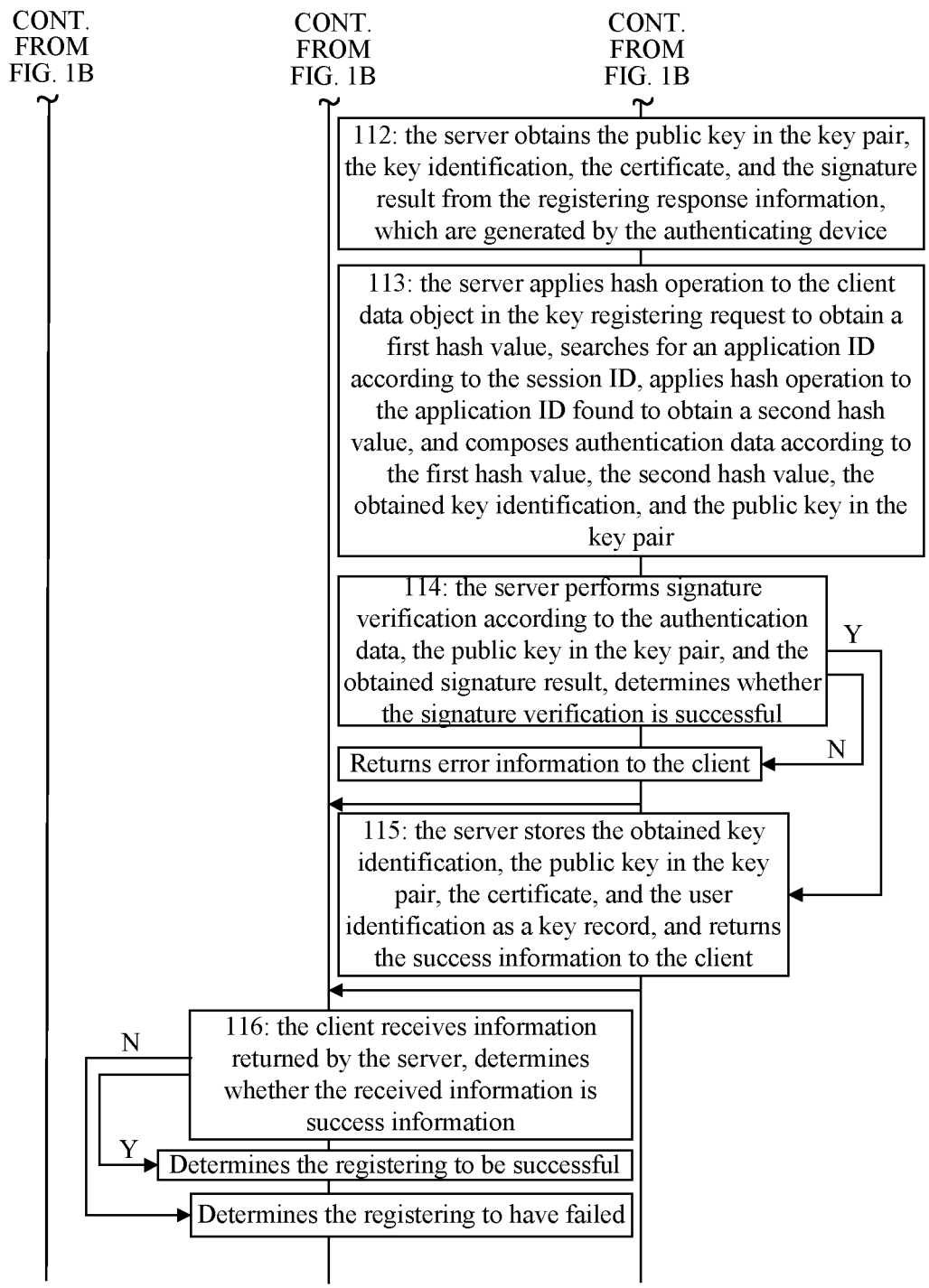

The disclosed Embodiment 1 provides a method for registering based on an authenticating device. FIGS. 1A-1C are flowcharts illustrating a method for registering based on an authenticating device and provided by Embodiment 1 of the present disclosure. As shown in FIGS. 1A-1C, the method particularly includes the following steps:

Step 101: a client obtains a uniform resource identifier (URI), obtains an application ID according to the obtained uniform resource identifier, obtains a device registering request according to the application ID and a user identification input by a user, and sends the device registering request to a server.

Specifically, if the client is a browser, the client may obtain a header field of an accessed uniform resource identifier and take the header field as the application ID. If the client is an Android system, the client may obtain content of apk-keyhash and take the same as the application ID. If the client is an iOS system, the client may obtain content of bundle-id and takes the same as the application ID.

For example, in the present embodiment, if the application ID is https://u2f.cloudentify.com and the user identification input by the user is feitianuser-1439363118730, the client will send a device registering request as below to the server:

https://api-dfserv.cloudentify.com?u2fmethod= enroll Data&userName=feitianuser-1439363118730&appId= https://u2f.cloudentify.com.

Step 102: the server receives the device registering request and parses the device registering request to obtain the application ID and the user identification.

Step 103: the server generates a challenge value and a session ID, combines a preset version number, the challenge value, the application ID and a session ID into registering data, and sends the registering data to the client.

Preferably, in the present embodiment, the server generates a random number as the challenge value, then generates another random number as the session ID.

For example, if the challenge value is oW0IZAfTrfBNsfF_Xfz8RQ, the preset version number is U2F_V2, and the session ID is e2317490-8bc3-4012-bcd9-19679147161f, the registering data will be "challenge": "oW0IZAfTrfBNsfF_Xfz8RQ", "appId":"https://u2f.cloudentify.com", "versi on":"U2F_V2", "sessionId": "e2317490-8bc3-4012-bcd9-19679147161f".

Step 104: the client receives the registering data, and obtains a client data object according to the challenge value and the application ID in the registering data.

Specifically, the client combines a first preset string, the challenge value and the application ID, and applies base64 encoding to data obtained by the combining to obtain the client data object.

For example, if the first preset string is navigator.id.finishEnrollment, the client data object will be:

"clientData":"eyJ0eXAiOiJuYXZpZ2F0b3Iua WQuZm luaXNoRW5yb2xsbWVu dCIsImNoYWxsZW5nZSI6Im 9XMElaQWZUcmZCTnNmRl9YZno4UlEiLCJjaWRfcH Via2V5Ijp7Imt0eSI6IkVDIiwiY3J2IjoiUC0yNTYiLCJ4IjoiQUxFcUkyWE81cGI2VTlO UEQ5ZE9hW HNUV2YvanN6STcxZUcwR2pUak4vZlMiLCJ5IjoiSkhrRTNJemgwV2Z 3akwrUktMS1VJYlg4cDBmZ2c1 T0dhMGprSG9iUnFHdz0ifSwib3JpZ21uIjoiaHR0cH M6Ly91MmYuY2xvdWRlbnRpZnkuY29tIn0".

Step 105: the client applies hash operation to the client data object to obtain a challenge parameter, applies hash operation to the application ID to obtain an application parameter, combines the challenge parameter and the application parameter into registering request information, and sends the registering request information to an authenticating device.

Specifically, in the present embodiment, the algorithm of the hash operation is SHA256.

Step 106: the authenticating device receives the registering request information and generates a key pair, a certificate and a key identification.

Step 107: the authenticating device obtains data to be signed according to the challenge parameter and the application parameter in the registering request information, the generated key identification, and a public key in the key pair.

Step 108: the authenticating device uses a private key in the generated key pair to sign the data to be signed according to a signature algorithm to obtain a signature result.

Specifically, in the present embodiment, the signature algorithm is Elliptic Curve Digital Signature Algorithm (ECDSA).

Step 109: the authenticating device combines the public key in the key pair, length of the key identification, the key identification, the certificate, and the signature result obtained through the signing into registering response information and sends the registering response information to the client.

For example, the authenticating device may send registering response information as below to the client:

"registrationData":"BQSgYsnoDgAx-tvZMC_mjn_vHr 89CPfvlIuAODRg3FWf 1XObVtfe_AhQVu3SHGSao_ 9xQC4OVVu836m9Gw17J8rtxhkEhNzsn9n3sVrYJ-GOq ELOzOQvgaJ1bS8xt-5xx3Rwa_RZQ6hQ9RwDuT2X1h S30ghmZPCAqyx3_WjZBdJK XScPu9rmTPgfJfff6 KD05Fdgq83OSQTge3MQmQ6hf7ra1MIOqSAPaQ0tVDgaJCvhy OnZMCZO1WICXJ6nQIhn D0i9Ywe DyZwbeOzbRi52YJz0leUnNovSoKl9DMYCSUnE oE2K3 XNoB5Slz_eRc8pqUDQoHDabAlC-ZbnfkR_LP jt0eSKs thc2zCCBCswggMToA MCAQICCBuiEo_cf4if MA0G CSqGSIb3DQEBCwUAMHcxCzAJBgNVBAYTAlV TM RcwFQYDVQQKEw5TdHJvbmd BdXRoIEluYzEa MBgGA1UECxMRRm9yIFRFU1Qg VXNlIE9ubHkx MzAxBgNVBAMTKlVUSFMgVGVzdCBSU0EgVG-9rZW4gQ2xhc3M gMyBTdDWJvcmRpbmF0ZSB DQTAeFw0xNTAzMTIyMzQxNDNaFw0yNTAzMTIyMz QxNDNaMHIxCzAJBgNVBAYTAlVTMRcwFQYDVQQKEw5TdHJvbmdBdXRoIElu YzEaMBgGA1UE CxM RRm9yIFRFU1QgVXNlIE9ubHkxLjAsBgNVBAMTJVVUSFM gVEVTVCBNaXhlZCBUb2tlbiBDb GFzcyAzIEJhdGNoNoIDEwWTATBgcqhkjOPQIBBg gqhkjOP QM BBwNCAARIFjT4wTtCFa7fZq6yzYbBI22PyE82Uzo72RCf-IzAIWHbF0x yxIh6iUtYx5uT_g5CVWx1Yvxrb 3wcuvRuftVIo4IBiTCCAYUwbAYIKwYBBQUHAQ EEYDBeMDEGCCsGAQUFBzAChiVodHRwOi8vb2NzcC51dGhzLndlYnNpdGUvYz Nyc2FzdWluY3J0 MCkGCCsGAQUFBzABhhlodHRwOi8vb2NzcC51dGhzLndlYnNpd GUvb2NzcDAdBgNVHQ4EFg QUyo H2DwZOqhzwhnSQ53QLjtLIeckwDAYDVR0TA QH_BAIwADAfBgNVHSMEGDAWgBSc9qHRfEGEdUJdH5ERuqbIfg3OjzCBtgYDV R0fBIGuMIGr MIGooCmgJ4 YlaHR0cDovL29jc3AudXRocy53Z WJzaXRlL2 MzcnNhc3 ViLmNybKJ7pHkwdzEzMDEGA1UEAwwq VVRIUyBUZXN0IFJTQSB b2tlbiBDbGF zcyAzIFN1Ym 9yZGluYXRlIENBMRowGAYDVQQLDBFGb3IgVEV TVCBVc2UgT2 5seTEXMBUGA1UECgwOU3Ryb25n QXV0aCBJbmMxCzAJBgNVBAYTAlVTMA4G A1Ud DwEB_wQEAwIHgDANB gkqhkiG9w0BAQsFAAO CAQEAJ7coKSS6CkCtA7lV LugwWMb7yhhLnQh7iXz DwDIGMNAboDhU15n7XT6xneqkV-1xUdhfaWkzlV RU-A 9KgL2hzOvfTGVO1yZydkUM6dNOaVB4_YDBDqtlw6mb-4t0XK9m8hGykG5pZLW 5HCdikeYggPDvPWSh4Ix8Gi71aBSzV4c06bBDdstv9C69C8kwX0RDkSrsOIHBupW Zj8iyvBQk2NheAd0fxz9AeCt Umfu3AQEKk_ DQZEngqzf23KrD4k4eKqCS9k87VSwN AZLl4USLtvV 8EO7ODOAsgvYF1XJ4iWr4kWmxqWBOLEB QbJloYy9_JenR2uUerKV 138OManyzBFAiEA8UGaJ- Y2 dKZHp- YPn0r4NSE5DiOB0qf_1VfLRuyib- Cg4ECIF Bvza xiFBOnl1_UV6TBl4Gxn3nyleJLJe3PYeOhGZY3".

Step 110: the client receives the registering response information, combines the registering response information, the client data object generated by the client, and the session ID in the registering data received by the client into a key registering request, and sends the key registering request to the server.

For example, the client may send a key registering request as below to the server:

https://api-dfserv.cloudentify.com?u2fmethod=enroll Finish&appId=https://u2f.cloudentify.com
&browserData=eyJ0eXAiOiJuYXZpZ2F0b3IuaWQuZ-mluaXNoRW5yb2xsbW VudCIsImNoYWxsZW5nZSI 6Im9XMElaQWZUcmZCTnNmRl9YZno4UlEiLCJjaWRf cHVia2V5Ijp7Imt0eSI6IkVDIiwiY3J2IjoiUC0yNTYiLCJ-4IjoiQUxFcUkyWE81cGI2V TlOUEQ5ZE9hWHNUV2Y vanN6STcxZUcwR2pUak4vZlMiLCJ5IjoiSkhrRTNJemgw V2Z3akwrUktMS1VJYlg4cDBmZ2c1T0dhMGprSG9iUn-FHdz0ifSwib3JpZ2luIjoiaHR0 cHM6Ly91MmYuY2xvxvd WRlbriRpZnkuY29tIn0
&enrollData=BQSgYsnoDgAx-tvZMC_mjn_vHr89CP fvlIuAODRg3FWf1XOb Vtfe_AhQVu3SHGSao_9xQC4 OVVu836m9Gw17J8rtxhkFhNzsn9n3sVrYJ-GOqELOz OQvgaJ1bS8xt-5xx3Rwa_RZQ6hQ9RwDuT2X1hS30g hm ZPCAqyx3_WjZBdJKXScPu 9rmTPgfJfff6KD05Fdgq83O SQTge3MQmQ6hf7ra1MIOqSAPaQ0-tVDgaJCvhyOnZM CZO1WICXJ6nQIhnD0i9YweDyZwbeOzbRi52YJz0le-UnNovSoKl9DMYCSUnEoE2K 3XNoB5Slz_ eRc8pq UDQoHDabAlC-ZbnfkR_LPjt0eSKsthc2zCCB CswggM-ToAMCA QICCBuiEo_cf4ifMA0GCSqGSIb3DQEBCw UAMHcxCzAJBgNVBAYTAlVTMRcwF QYDVQQ KEw5TdHJvbmdBdXRoIEluYzEaMBgGA1UECxMRR-m9yIFRFU1QgVXNl IE9ubHkxMzAxBgNVBAMTKl VUSFMgVGVzdCBSU0EgVG9rZW4gQ2xhc3MgMyB TdWJvcmRpbmF0ZSBDQTAeFw0xNTAzMTIyMzQxN-DNaFw0yNTAzMTIyMzQxND NaMHIxCzAJBgNVBAY TAlVTMRcwFQYDVQQKEw5TdHJvbmdBdXRoIEluYzEaM BgGA1UECxMRRm9yIFRFU1 QgVXNlI E9ubHkx LjAsBgNVBAMTJVVUSFMgVEVT VCB NaXhlZCBUb2tlbiBDbGFzcyAzIEJhdGNoNoIDEwWTA-TBgcqhkjOPQIBBggqhkjO PQMBBwNCAARIFjT4wTt-CFa7fZq6yzYbBI22PyE82Uzo72RCf-IzAIWHbF0xyxlh6i UtYx5uT_g5CVWx1Yvxrb3wcuvRuftVIo4IBiTCCAYU-wbAYIKwYBBQUHAQEEYD BeMDEGCCsGAQUFBz-AChiVodHRwOi8vb2NzcC51dGhzLndlYnNpdGUvYzNy-c2Fz dWIuY3J0MCkGCCsGAQUFBzABhh1odHRwOi 8vb2NzcC51dGhzLndlYnNpdGUvb2 NzcDAdBgNVHQ4 EFgQUyoH2DwZOqhzwhnSQ53QLjtLIeckwDAYDVR0-TAQH_BA IwADAfBgNVHSMEGDAWgBSc9q HRfE-GEdUJdH5ERuqbIfg3OjzCBtgYDVR0fBIG uMIGrMI-GooCmgJ4YlaHR0cDovL29jc3AudXRRocy53ZWJzaXRl-L2MzcnNhc3ViLmN ybKJ7pHkwdzEzMDEGA1UE-AwwqVVRIUyBUZXN0IFJTQSBUb2tlbiBDbGFzcyAzI FN1Ym9yZGluYXRlIENBMRowGAYDVQQLDBFGb3-IgVEVTVCBVc2UgT25seTEX MBUGA1UECgwOU3-Ryb 25nQXV0aCBJbmMxCzAJBgNVBAYTAlVTMA4G-A1UdD wEB_wQEAwIHgDANBgkqhkiG9w0BAQs FA AO CAQEAJ7coKSS6CkCtA7lVLugwW Mb7yhhLn Qh7 iXzDwDIGMNABoDhU15n7XT6xneqkV-1xUdhfaWkz IVRU-A9KgL2h zOvfTGVO1yZydkUM6dNOaVB4_YD-BDqtlw6mb-4t0XK9m8hGykG5pZLW5HCdik eYggPDv P-WSh4Ix8Gi71aBSzV4c06bBDdstv9C69C8kwX0RDk-SrsOIHBupWZj8iyvB Qk2NheAd0fxz9AeCtUmfu3 AQ EKk_DQZEngqzf23KrD4k4eKqCS9k87VSwNAZLl4U SL tvV8EO7OD0AsgvYF1XJ4iWr4kWmxqWBOLEBQbJlojYy9_JenR2uUerKV138OMa nyzBFAiEA8UGaJY2d KZ HpY Pn0r4NSE5DiOB0qf_1VfLRuyib Cg4ECIFB vzaxiF-BOnl 1_UV6TBl4Gxn3nyleJLJe3PYeOhGZY3 &session-Id=e2317490-8bc3-4012-bcd9-19679147161f.

Step 111: the server receives the key registering request and parses the same to obtain the registering response information, the client data object and the session ID.

Step 112: the server obtains the public key in the key pair, the key identification, the certificate, and the signature result from the registering response information, which are generated by the authenticating device.

Step 113: the server applies hash operation to the client data object in the key registering request to obtain a first hash value, searches for an application ID according to the session ID, applies hash operation to the application ID found to obtain a second hash value, and forms verifying data according to the first hash value, the second hash value, the obtained key identification, and the public key in the key pair.

Step 114: the server performs signature verification according to the verifying data, the public key in the key pair, and the obtained signature result, determines whether the signature verification is successful, and, if yes, executes Step 115, otherwise, returns error information to the client.

Specifically, the server deciphers the obtained signature result according to the signature algorithm and the public key in the key pair to obtain a deciphered signature result. The server verifies whether the deciphered signature matches the verifying data and, if yes, the signature verification is determined to be successful, otherwise, the signature verification is determined to be failed.

Step 115: the server stores the obtained key identification, the public key in the key pair, the certificate, and the user identification as a key record, and returns the success information to the client.

Step 116: the client receives information returned by the server, determines whether the received information is success information and, if yes, the registering is determined to be successful, otherwise, the registering is determined to be failed.

In this embodiment, an authenticating device participates in a process of identity authentication and stores a private key of a user therein, making it harder for cyber offenders to obtain these information. During the identity authentication, the private key will not be sent out, and after the identity has been authenticated successfully, the client will not keep any login information. Thus, rapid identity authentication is realized and security for Internet is improved.

Embodiment 2

Figure 2A:
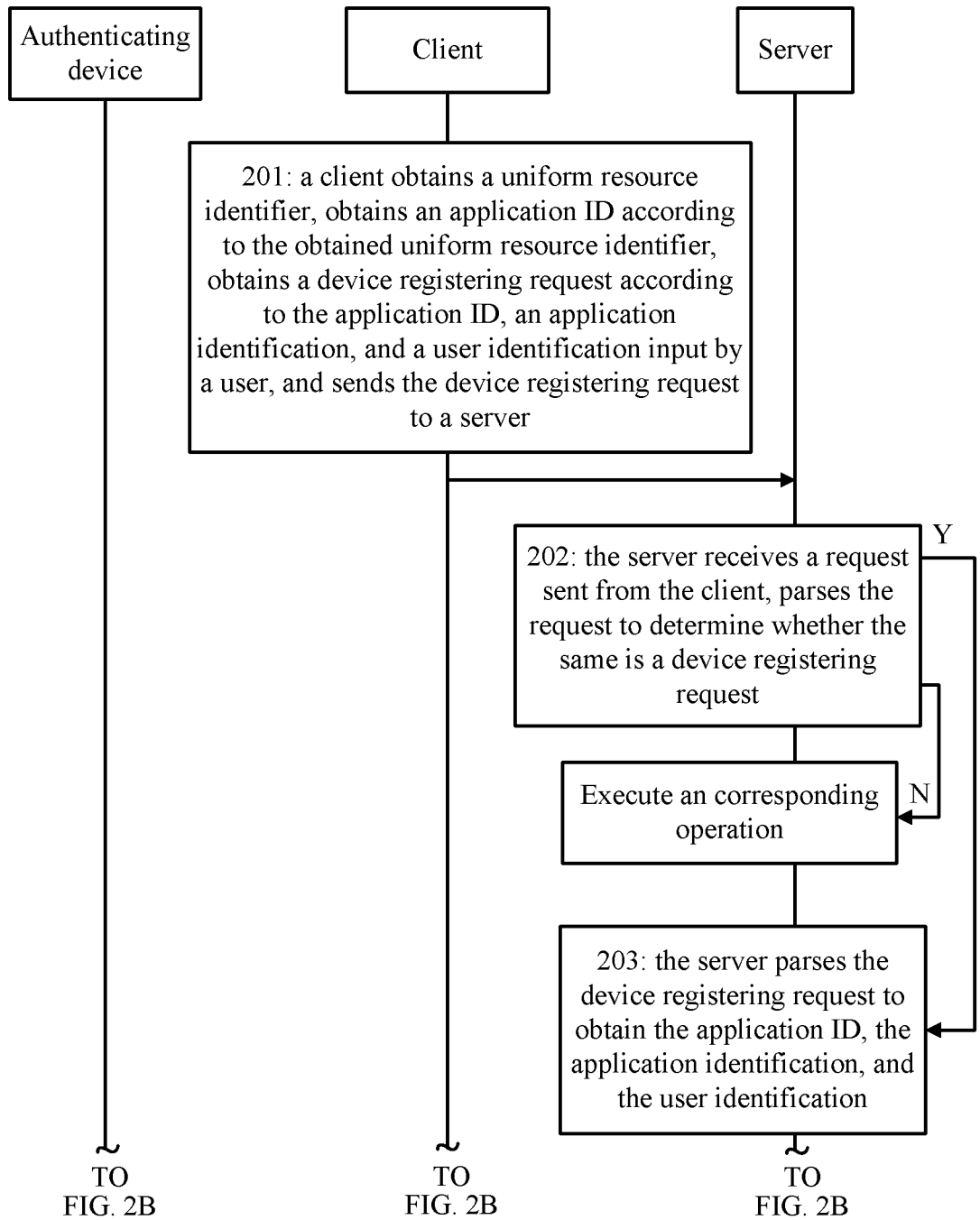
FIG. 2A-2C are flowcharts illustrating a method for registering based on an authenticating device and provided by Embodiment 2 of the present disclosure.
Figure 2B:
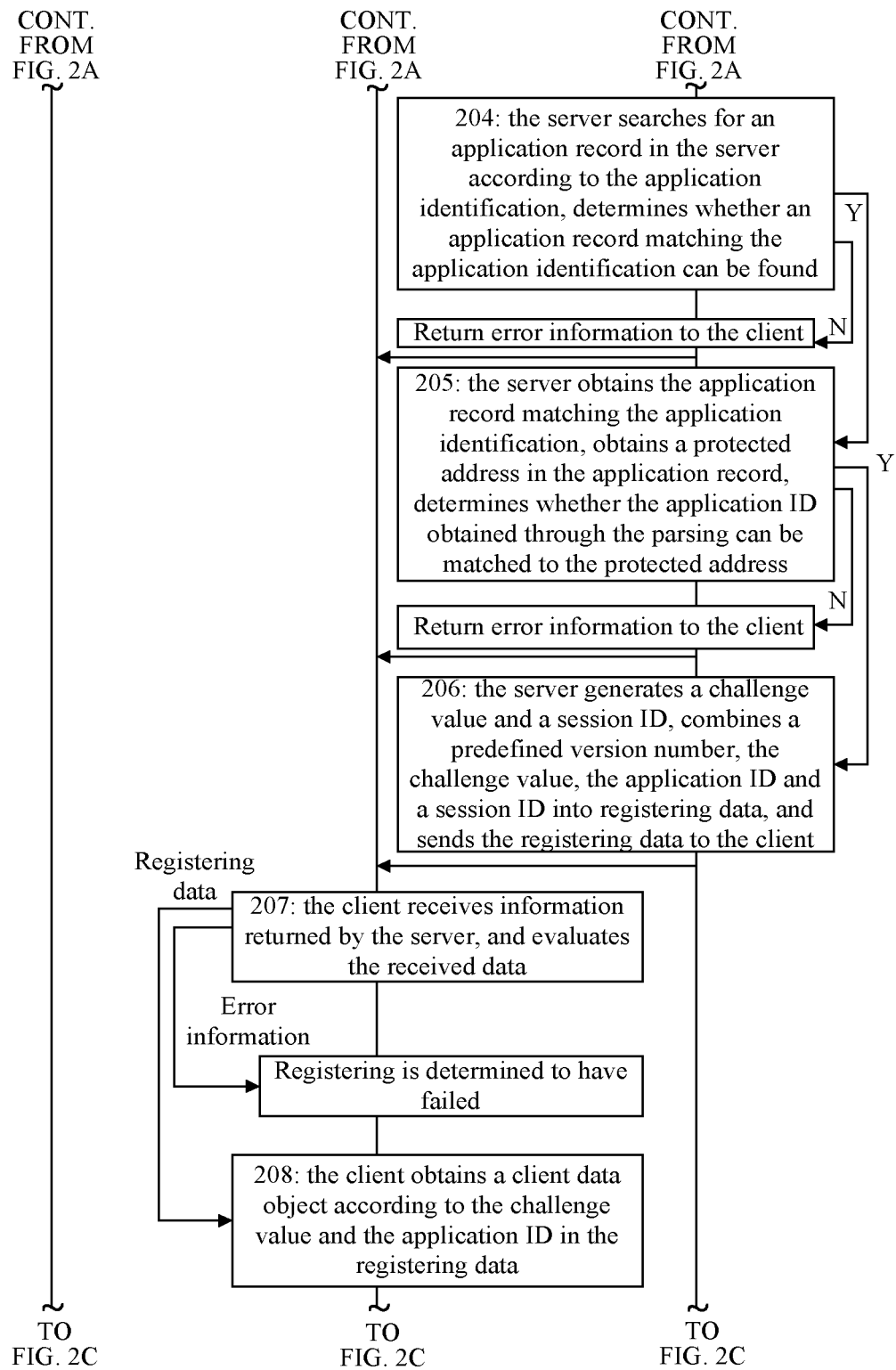
Figure 2C:
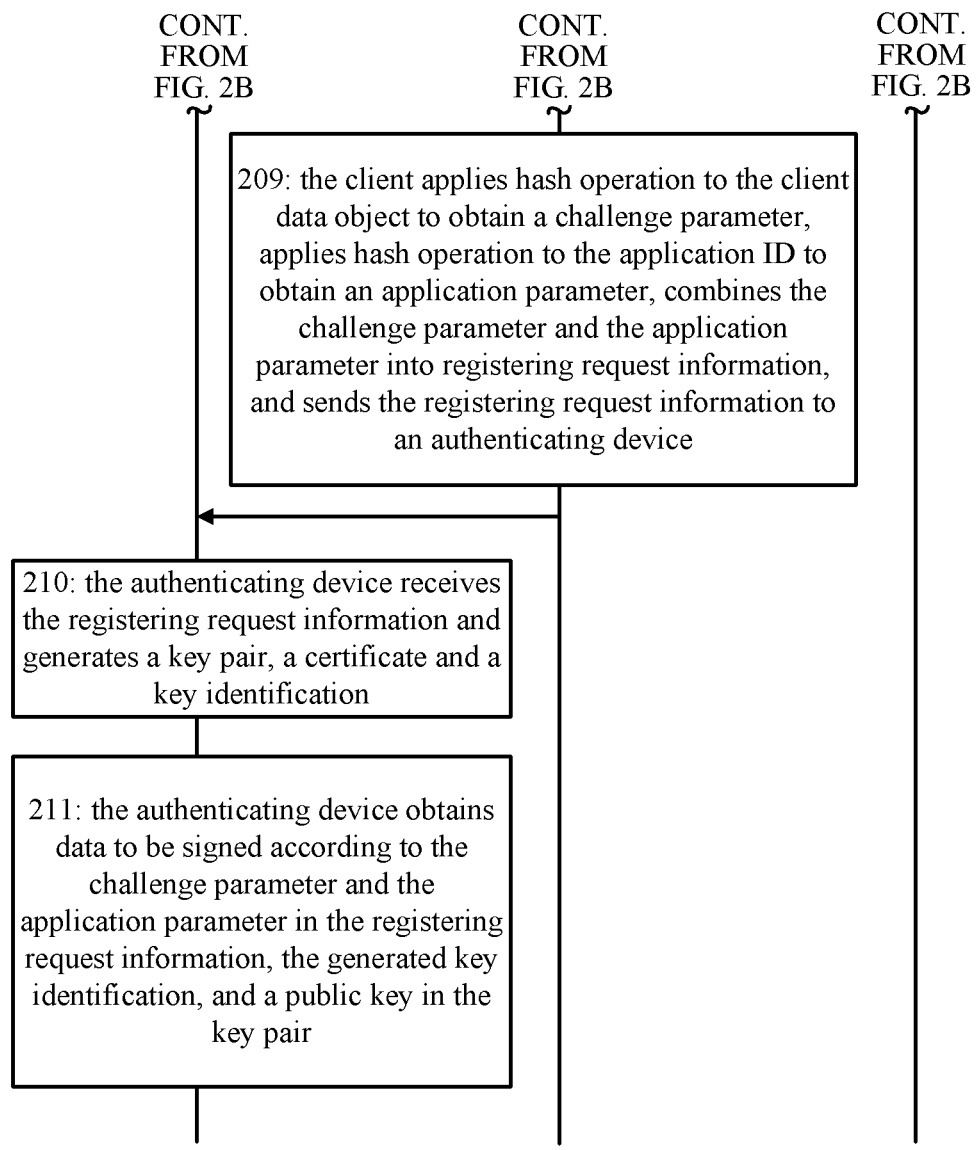
Figure 3A:
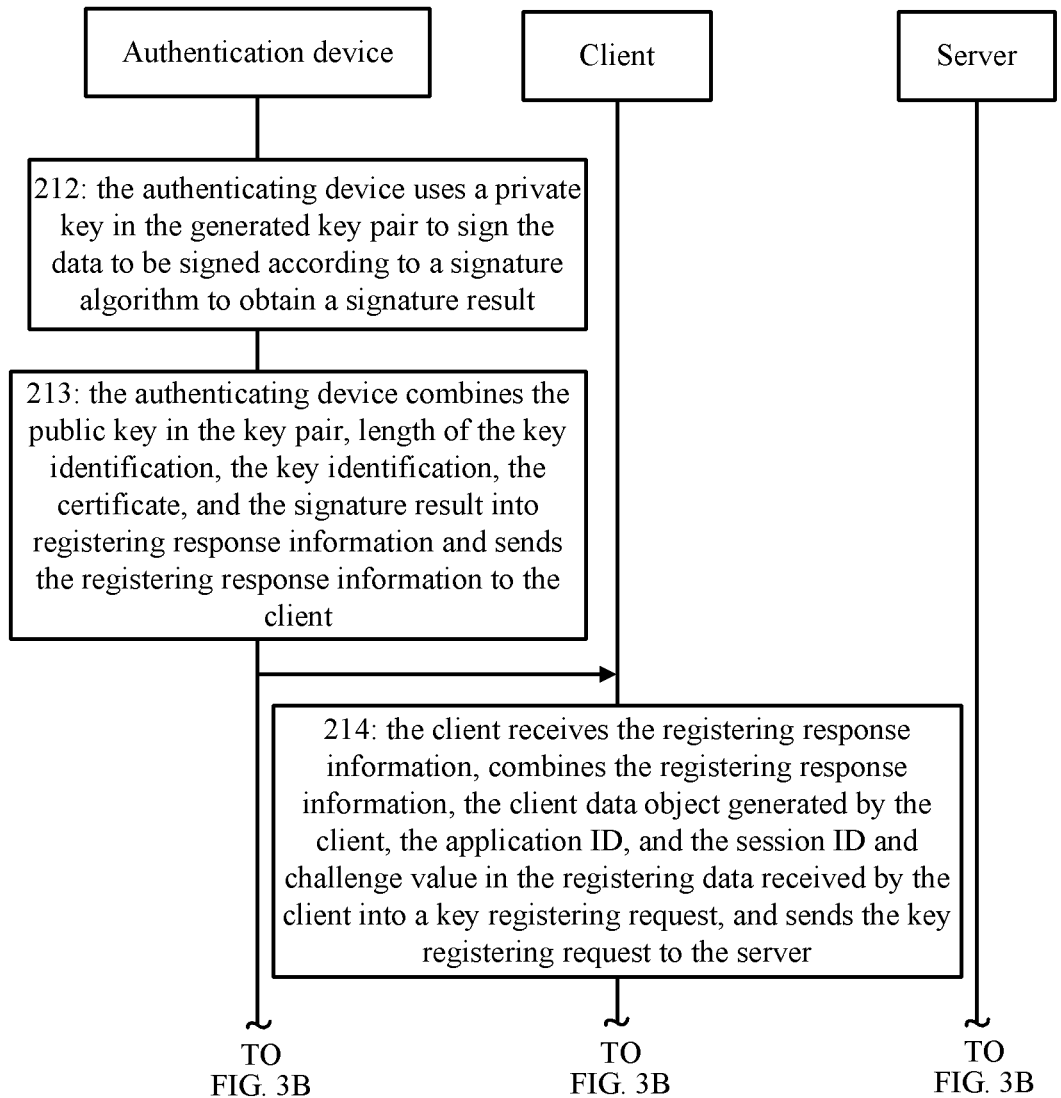
FIG. 3A-3C are flowcharts illustrating a method for registering based on an authenticating device and provided by Embodiment 2 of the present disclosure.
Figure 3B:
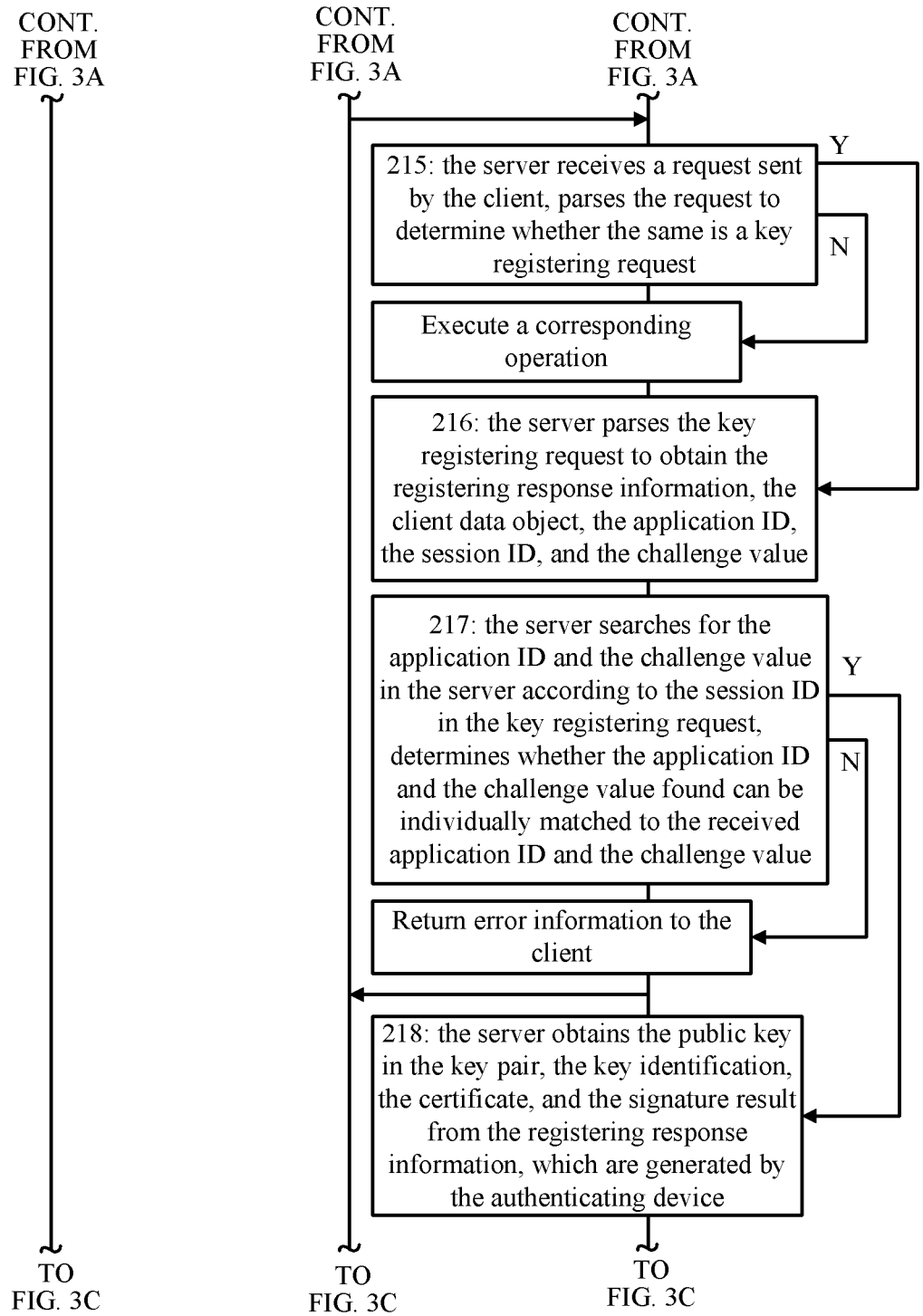
Figure 3C:
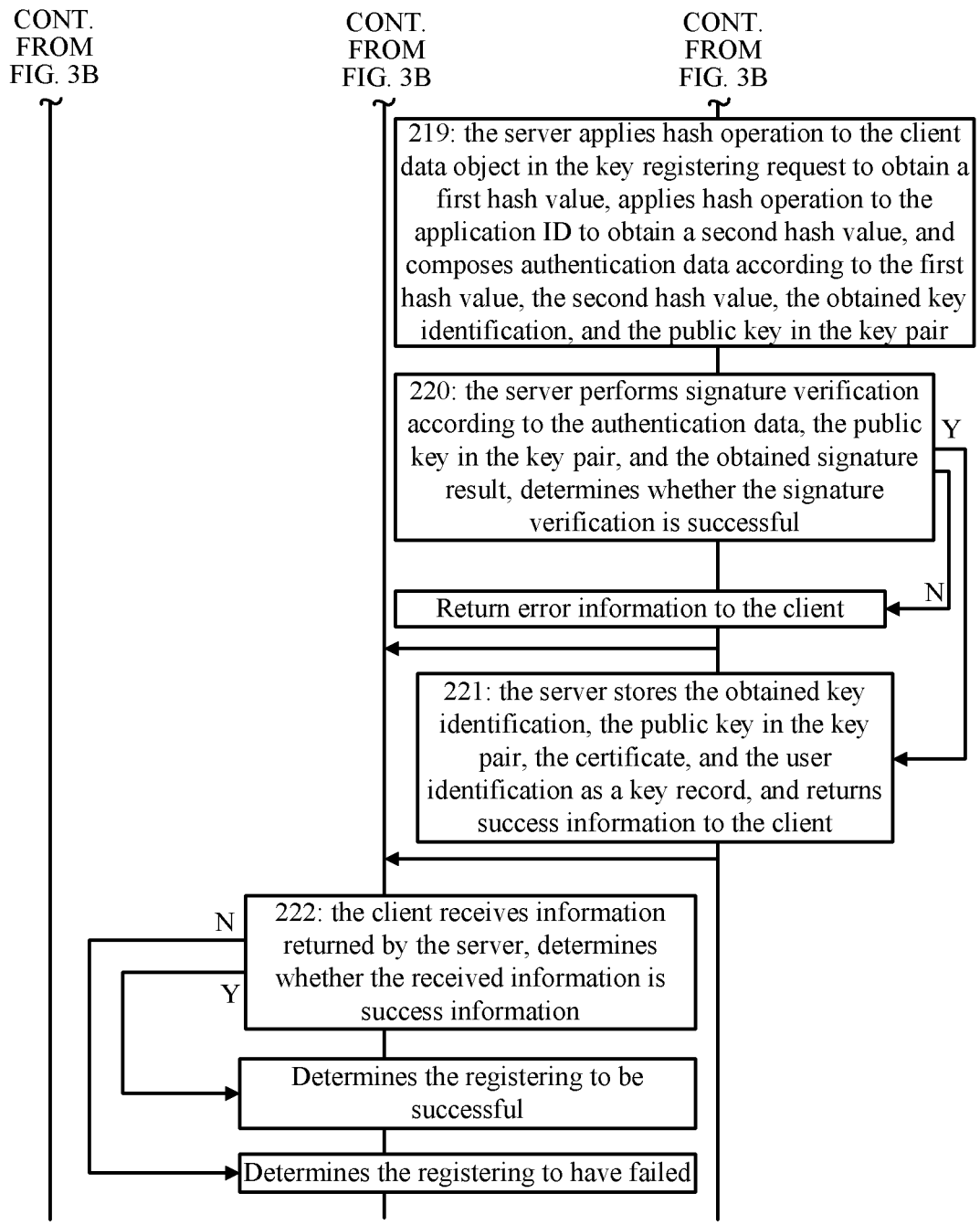

The disclosed Embodiment 2 provides a method for registering based on an authenticating device. FIGS. 2A-2C are flowcharts illustrating a method for registering based on an authenticating device and provided by Embodiment 2 of the present disclosure. FIGS. 3A-3C are flowcharts illustrating a method for registering based on an authenticating device and provided by Embodiment 2 of the present disclosure. As shown in FIGS. 2A-2C and 3A-3C, the method specifically includes the following steps:

Step 201: a client obtains a uniform resource identifier (URI), obtains an application ID according to the obtained uniform resource identifier, obtains a device registering request according to the application ID, an application identification, and a user identification input by a user, and sends the device registering request to a server.

Specifically, if the client is a browser, the client may obtain a header field of an accessed uniform resource identifier and take the header field as the application ID. If the client is an Android system, the client may obtain content of apk-keyhash and take the content as the application ID. If the client is an iOS system, the client may obtain content of bundle-id and takes the content as the application ID.

For example, in the present embodiment, if the application ID is https://u2f.cloudentify.com, the application identification is 89F4D9133E7105CB2654, and the user identification input by the user is feitianuser-1439363118730, the client will send a device registering request as below to the server:

https://api-dfserv.cloudentify.com?u2fmethod= enrollData& appkey=89F4D9133 E7105CB2654&userName= feitianuser-1439363118730&appId=https://u2f.cloudentify.com.

Step 202: the server receives a request sent from the client, parses the request to determine whether the received request is a device registering request and, if yes, executes Step 203, otherwise, executes a corresponding operation.

Step 203: the server parses the device registering request to obtain the application ID, the application identification, and the user identification.

For example, the server may parse the device registering request to find out that the application ID is https://u2f.cloudentify.com, the application identification is 89F4D9133E7105CB2654, and the user identification is feitianuser-1439363118730.

Step 204: the server searches for an application record in the server according to the application identification, determines whether an application record corresponding to the application identification can be found and, if yes, executes Step 205, otherwise, returns error information to the client.

Step 205: the server obtains the application record corresponding to the application identification, obtains a protected address from the application record, determines whether the application ID obtained through the parsing can be matched to the obtained protected address and, if yes, executes Step 206, otherwise, returns error information to the client.

Specifically, the server determines whether the application ID obtained through the parsing can be matched to the obtained protected address and, if yes, determines that the application ID matches the obtained protected address, otherwise, determines that no application ID can be matched to the obtained protected address.

Step 206: the server generates a challenge value and a session ID, combines a preset version number, the challenge value, the application ID and a session ID into registering data, and sends the registering data to the client.

Preferably, in the present embodiment, the server generates a random number as the challenge value, then generates another random number and combines the same with the user identification to produce the session ID.

For example, if the challenge value is oW0IZAfTrfBNsfF_Xfz8RQ, the preset version number is U2F_V2, and the session ID is feitianuser-1439363118730_e2317490-8bc3-4012-bcd9-19679147161f, and the registering data will be:

"challenge":"oW0IZAfTrfBNsfF_Xfz8RQ", "appId": "https://u2f.cloudentify.com","version":"U2F_V2", "sessionId":"feitianuser-1439363118730_e2317490-8bc3-4012-bcd9-19679147161f".

Step 207: the client receives information returned by the server, evaluates the received data, and determines the registering is failed if the data is error information, or executes Step 208 if the data is registering data.

Step 208: the client obtains a client data object according to the challenge value and the application ID in the registering data.

Specifically, the client combines a first preset string, the challenge value and the application ID, and applies base64 encoding to data obtained by the combining to obtain the client data object.

For example, if the first preset string is navigator.id.finishEnrollment, the client data object will be:

"clientData": "eyJ0eXAiOiJuYXZpZ2F0b3IuaWQuZmluaXNoRW5yb-2xsbWVudCI sImNoYWxsZW5nZSI6Im9XMElaQW ZUcm ZCTnNmRl9YZno4UlEiLCJjaWRfcHVia2V5 Ijp7Imt0eSI6IkVDIiwiY3J2IjoiUC0yNTYiLCJ4IjoiQUx-FcUkyWE81cGI2VTlOUEQ5ZE9h WHNUV2Yvan N6S TcxZUcwR2pUak4vZlMiLCJ5IjoiSkhrRTNJemgwV2Z3-akwrUktMS1V JYlg4cDBmZ2c1T0dhMGprSG9iUn FHdz0ifS wib3JpZ2luIjoiaHR0cHM6Ly91MmYuY2xvd WRlbnRpZnkuY29tIn0".

Step 209: the client applies hash operation to the client data object to obtain a challenge parameter, applies hash operation to the application ID to obtain an application parameter, combines the challenge parameter and the application parameter into registering request information, and sends the registering request information to an authenticating device.

Specifically, in the present embodiment, the hash operation is of SHA256 algorithm.

Step 210: the authenticating device receives the registering request information and generates a key pair, a certificate and a key identification.

Step 211: the authenticating device obtains data to be signed according to the challenge parameter and the application parameter in the registering request information, the generated key identification, and a public key in the key pair.

Step 212: the authenticating device uses a private key in the generated key pair to sign the data to be signed according to a signature algorithm to obtain a signature result.

Specifically, in the present embodiment, the signature algorithm is Elliptic Curve Digital Signature Algorithm (ECDSA).

Step 213: the authenticating device combines the public key in the key pair, length of the key identification, the key identification, the certificate, and the signature result into registering response information and sends the registering response information to the client.

For example, the authenticating device may send registering response information as below to the client:

"registrationData":"BQSgYsnoDgAx-tvZMC_mjn_ vH r89CPfvlIuAODRg3FWf1X ObVtfe_AhQVu3SHGSao_ 9xQC4OVVu836m9Gw17J8rtxhkFhNzsn9n3sVrYJ-GO-qELOzO QvgaJ1bS8xt-5xx3Rwa_RZQ6hQ9RwDuT2X1h S30ghmZPCAqyx3_WjZBdJKXScPu9rmT PgfJfff6KD05 Fdgq83 OSQTge3MQmQ6hf7ra1MIOqSAPaQ0-tVD gaJ CvhyOnZMCZO1WI CXJ6nQIhnD0i9Ywe DyZwbeOz-bRi5 2YJz0leUnNovSoKl9DMYCSUnEoE2K3XNoB 5Slz_eRc8pqUDQoHDabAlC-ZbnfkR_LPjt0eSKsthc2z CCBCswggMToAMCAQICCBuiEo_cf4if MA0GCSq GSIb3DQEBCwUAMHcxCzAJBgNVBAYTAlVTMRcw-FQYDVQQKEw5TdHJ vbmdBdXRoRoIEluYzEaMBgGA1U ECxMRRm9yIFRFU1QgVXNlIIE9ubHkxMzAxBgNVBA MTKlVUSFMgVGVzdCBSU0EgVG9rZW4gQ2xhc3 MgMyBTdWJvcmRpbmF0ZSBDQTA eFw0xNTAzMTIy MzQxNDNaFw0yNTAzMTIyMzQxNDNaMHIxCzAJBg-NVBAYTAlVT MRcwFQYDVQQKEw5TdHJv bmd BdXRoRoIEluYzEaMBgGA1UECxMRRm9yIFRFU1QgV XNlIIE9ubHkxLjAsBgNVBAMTJVVUSFMgVEVTVCB-NaXhlZCBUb2tlbiBDbGFzcyAzIE JhdGNoNoIDEwWTATB-gcqh kjOPQIBBggqhkjOPQMBBwNCAAR1FjT4w TtC Fa7fZq6yzYb BI22PyE82Uzo72RCf-IzAIWHbF0xyxl h6 iUtYx5uT_g5CVWx1Yvxrb3wcuvRuftVIo4IBiT CCAYU wbAYIKwYBBQUHAQEEYDBeMDEGCCsGAQUFBz- AChiVodfiRwOi8vb2Nzc C51dGhzLndlYnNpdGUv Yz Nyc2 FzdWIuY3J0MCkGCCsGAQUFBzABhh1odHRwOi 8vb2 NzcC51dGhzLndlYnNpdGUvb2NzcDAdBgNVHQ4 EFgQUyoH2DwZOqhzwhnSQ53QLjtL IeckwDAYDVR0T AQH_BAIwADAfBgNVHSMEGDAWgBSc9qHRfEGE- dUJdH5ERuqbIf g3OjzCBtgYDVR0fBIGuMIGrMIGoo CmgJ4 YlaHR0cDovL29jc3AudXRocy53ZWJzaXRlL 2MzcnNhc3ViLmNybKJ7pHkwdzEzMDEGA1UEAwwq- VVRIUyBUZXN0IFJTQSBUb2tlb iBDbGFzcyAzIFN1Y m9yZGluYXRlIENBMRowGAYDVQQLDBFGb3IgVE- VTVCBVc2U gT25seTEXMBUGA1UECgwOU3Ryb25 nQX V0aCBJbmMxCzAJBgNVBAYTAlVTMA4 GA1Ud DwEB_wQEAwIHgDANBgkqhkiG9w0BAQsFAAOCA- QEAJ7coKSS6CkCtA7lVL ugwWMb7yhhLnQh7iXzDw DIGM NAboDhU15n7XT6xneqkV-1xUdhfaWkz1VRU- A9KgL 2hzOvfTGVO1yZydkUM6dNOaVB4_YD-BDq tlw6mb-4t0XK9m8hGykG5pZLW5HCdike YggPDvP-W Sh4Ix8Gi71aBSzV4c06bBDdstv9C69C8kwX0RDkSrsOI HBupWZj8iyvBQk2 NheAd0fxz9AeCtUmfu3AQEKk_ DQZEngqzf23 KrD4k4eKqCS9k87 VSwNAZLl4USLtvV8 EO7OD0AsgvYF1XJ4iWr4kWmxqWBOLEBQbJloYy9_ JenR2uUerKV138OManyzBFAiE A8UGaJY2dKZHp YPn0r4NSE5DiOB0qf_1VfLRuyibCg4ECIFBvzaxiFB- Onl1_UV6TB14G xn3nyleJLJe3PYeOhGZY3".

Step 214: the client receives the registering response information, combines the registering response information, the client data object generated by the client, the application ID, and the session ID and challenge value in the registering data received by the client into a key registering request, and sends the key registering request to the server.

For example, the client may send a key registering request as below to the server:

https://api-dfserv.cloudentify.com?u2fmethod=enroll Finish &appkey=89F4D9133E7 105CB2654&appId= https://u2f. cloudentify.com
&browserData=eyJ0eXAiOiJuYXZpZ2F0b3IuaWQuZ- mluaXNoRW5yb2xsbWVud CIsImNoYWxsZW5n ZSI6 Im9XMEl aQWZUcmZCTnNmRl9YZno4UlEiL CJjaWR- fcHVia2 V5Ijp7Imt0eSI6IkVDIiwiY3J2IjoiUC0yNTYi LCJ4IjoiQUxFcUkyWE81cGI2 VTlOUEQ5ZE 9hWHN UV2YvanN6STcxZUcwR2pUak4vZlMiLCJ5IjoiSkhrRT- NJemgwV2Z3akwrUktMS 1VJYlg4cDBmZ2c1T0dhM GprS G9iUnFHdz0ifSwib3JpZ2luIjoiaHR0c HM6Ly9 1MmYuY2 xvdWRlbnRpZnkuY29tIn0
&enrollData=BQSgYsnoDgAx-tvZMC_mjn_vHr8 9C PfvlIu AODRg3FWflXObVtfe_ AhQVu3SHGSao_ 9xQC4OVVu836m9Gw17J8rtxhkFhNzsn9n3sVrYJ-GO- qELOzOQvgaJ1 bS8xt-5xx3Rwa_RZQ6hQ9RwDu T2X1hS30ghmZPCAqyx3_WjZBdJKXScPu9rmTPgfJfff6 KD05 Fdgq83OSQTge3MQmQ6hf7ra1MIOqSAPaQ0- tVDgaJCvhyOnZMCZO1WICXJ6nQI hnD0i9YweDy Zwbe OzbRi52YJz0leUnNovSoKl9DMYCSUnEoE2K3X No B5Slz_eRc8pqU DQoHDabA1C-ZbnfkR_LPjt0eS Ksthc2zCCBCswggMToAMCAQICCBuiEo_cf4ifMA0 GCS qGSIb3DQEBCwUAMHcxCzAJBgNVBAYTAlV TMRcwFQYDVQQKEw5TdHJvbmdBd XRoIEluYz EaMBgGA1UECxMRRm9yIFRFU1QgVXN1IE9ubHlx- MzAxBgNVBAMTKlV USFMgVGVzdCBSU0Eg VG 9rZW4gQ2xhc3MgMyBTdWJvcmRpbmF0ZSBDQTAe Fw0x NTAzMTIyMzQxNDNaFw0yNTAzMTIyMz QxND- NaMHIxCzAJBgNVBAYTAlVTMRcw FQYDVQQKEw5 TdHJvbmdBdXRoIEluYzEaMBgGA1UECxMRRm9yIF RFU1QgVXNlIE 9ubHkxLjAsBgNVBAMTJVVUSF MgVEVTVCBNaXh1ZCBUb2tlbiBDbGFzcyAzIEJhdG NoIDEwWTATBgcqhkjOPQIBBggqhkjOPQMBBwNCA- ARlFjT4wTtCFa7fZq6yzYbBI22P yE82Uzo72RCf-Iz AI WHbF0xyxlh6iUtYx5uT_g5CVWx1Yvxrb3wcuvRuftVIo 4IBiTCCAY UwbAYIKwYBBQUHAQEEYDBeMDEGC Cs GAQUFBzAChiVodHRwOi8vb2NzcC51dG hzLndl YnNpdGUvYzNyc2FzdWIuY3J0MCkGCCsGAQUFBz ABhh 1odHRwOi8vb2NzcC5 1dGhzLndlYnNpdGUvb2 NzcDAdBgNVHQ4EFgQUyoH2DwZOqhzwhnSQ53 QLj tLIeckw DAYDVR0TAQH_BAIwADAfBgNVHSMEGD AWgBSc9qHRfEGEdUJdH5ERuqbIfg3 OjzCBtgYD VR0f BIGuMIGrMIGooCmgJ4YlaHR0 cDovL29jc3 AudXRoc y53ZWJzaXRlL2Mzc nNhc3ViLmNybKJ7pHkwdzEzMD EGA1UEAwwqVVRIUyBUZXN0IFJTQSBUb2tlbiBDb GFzcyAzIFN1Ym9yZGluYXRlIENBMRowGAYDVQQ LDBFGb3IgVEVTVCBVc2UgT25 seTEXMBUGA1UE CgwOU3Ryb25nQXV0aCBJbmMxCzAJBgNVBAYTAl VTMA4GA1U dDwEB_wQEAwIHgDANBgkqh kiG9w 0BAQsFAAOCAQEAJ7coKSS6CkCtA71VLugwW Mb7y hhLnQh7iXzDwDIGMNAboDhU15n7XT6xneqkV-1xUd- hfaWkzlVRU-A9KgL2 hzOv fTGVO1yZydk UM6d NOaVB4_YD-BDqtlw6mb-4t0XK9m8hGykG5pZL W5H CdikeYggPD vP-WSh4Ix8Gi71aBSzV4c06bBDdstv9C69 C8kw X0RDkSrsOIHBupWZj8iyvBQk2NheAd0 fxz9 AeCtUmfu3AQEKk_DQZEngqzf23KrD4k4eKqCS9k87 VSwNAZL14USLtvV8EO7OD 0AsgvYF1XJ4iWr4k Wm xqWBOLEBQbJloYy9_JenR2uUerKV138OManyzBFAi EA8UGaJ Y2dKZHpYPn0r4NSE5DiOB0qf_ 1VfL Ru yibCg4ECIFBvzaxiFBOnl1_UV6TB14Gxn3nyleJ LJe3PYeOhGZY3
&challenge=oW0IZAfTrfBNsfF_Xfz8RQ
&sessionId=feitianuser-1439363118730_e2317490- 8bc3-4012-bcd9-19679147161f.

Step 215: the server receives a request sent by the client, parses the request to determine whether the received request is a key registering request and, if yes, executes Step 216, otherwise, and executes a corresponding operation.

Step 216: the server parses the key registering request to obtain the registering response information, the client data object, the application ID, the session ID, and the challenge value.

Step 217: the server searches for the application ID and the challenge value in the server according to the session ID in the key registering request, determines whether the application ID and the challenge value found can be individually matched to the received application ID and the challenge value and, if yes, executes Step 218, otherwise, returns error information to the client.

Step 218: the server obtains the public key in the key pair, the key identification, the certificate, and the signature result from the registering response information, which are generated by the authenticating device.

Step 219: the server applies hash operation to the client data object in the key registering request to obtain a first hash value, applies hash operation to the application ID to obtain a second hash value, and composes verifying data according to the first hash value, the second hash value, the obtained key identification, and the public key in the key pair.

Step 220: the server performs signature verification according to the verifying data, the public key in the key pair, and the obtained signature result, determines whether the signature verification is successful and, if yes, executes Step 221, otherwise, returns error information to the client.

Specifically, the server deciphers the obtained signature result according to the signature algorithm and the public key in the key pair to obtain a deciphered signature result. The server verifies whether the deciphered signature matches the verifying data and, if yes, the signature verification is determined to be successful, otherwise, the signature verification is determined to have failed.

Step 221: the server stores the obtained key identification, the public key in the key pair, the certificate, and the user identification as a key record, and returns the success information to the client.

In addition, the server may also store the obtained key identification, the public key in the key pair, the certificate, the user identification and the application ID as the key record.

Step 222: the client receives information returned by the server, determines whether the received information is success information and, if yes, determines that the registering is successful, otherwise, determines that the registering is failed.

In this embodiment, an authenticating device participates in a process of identity authentication and stores a private key of a user therein, making it harder for cyber offenders to obtain these information. During the identity authentication, the private key will not be sent out, and after the identity has been authenticated successfully, the client will not keep any login information. Thus, rapid identity authentication is realized and security for Internet is improved.

Embodiment 3

Figure 4:
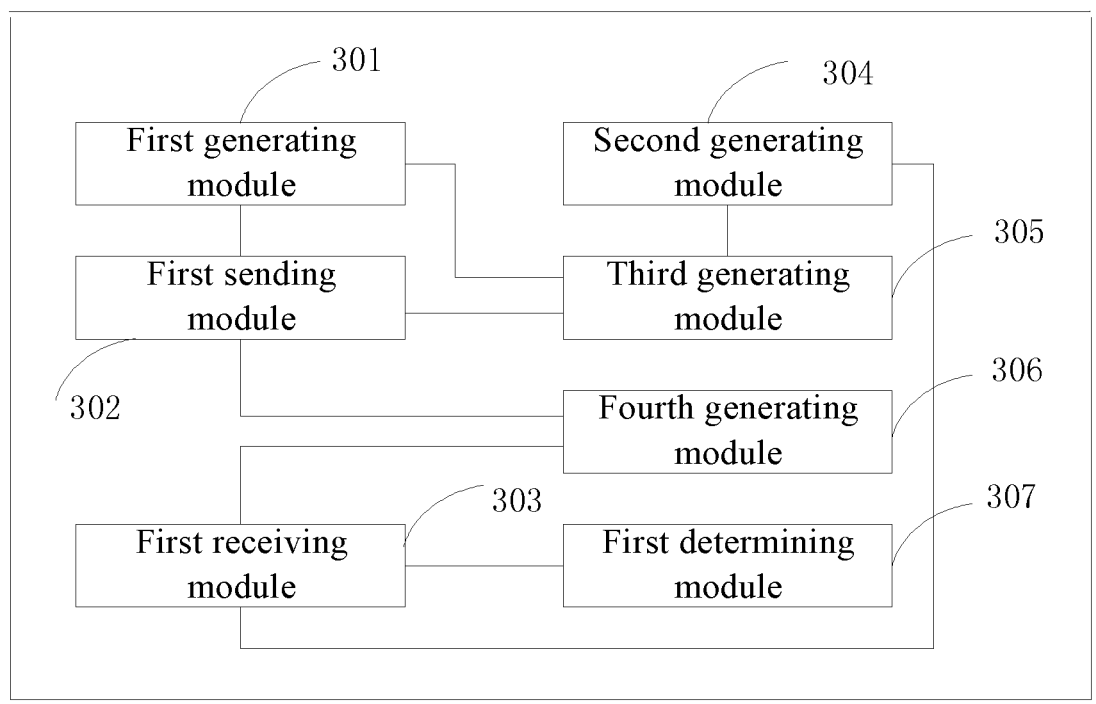
FIG. 4 is a structural diagram illustrating a client for registering based on an authenticating device and provided by Embodiment 3 of the present disclosure.

The Embodiment 3 provides a client for registering based on an authenticating device. FIG. 4 is a structural diagram illustrating a client for registering based on an authenticating device and provided by Embodiment 3 of the present disclosure. As shown in FIG. 4, the client includes: a first generating module 301, a first sending module 302, a first receiving module 303, a second generating module 304, a third generating module 305, a fourth generating module 306, and a first determining module 307.

The first generating module 301 is configured to obtain an application ID according to the uniform resource identifier, and obtain a device registering request according to the application ID and a user identification input by a user.

The first sending module 302 is configured to send the device registering request generated by the first generating module 301 to the server, send registering request information generated by the third generating module 305 to the authenticating device, and send a key registering request generated by the fourth generating module 306 to the server.

The first receiving module 303 is configured to receive registering data returned by the server, receive registering response information returned by the authenticating device, and receive information returned by the server.

The second generating module 304 is configured to obtain a client data object according to a challenge value and the application ID in the registering data received by the first receiving module 303.

The third generating module 305 is configured to apply hash operation to the client data object generated by the second generating module 304 to obtain a challenge parameter, apply hash operation to the application ID in the first generating module 301 to obtain an application parameter, and combine the challenge parameter and the application parameter into registering request information.

The fourth generating module 306 is configured to combine the registering response information received by the first receiving module 303, the client data object, and a session ID in the registering data received by the first receiving module 303 into the key registering request.

The first determining module 307 is configured to determine whether the information received by the first receiving module 303 is success information and, if yes, determine that the registering is successful, otherwise, determine that the registering failed.

Further, the second generating module 304 is configured to combine a first preset string, the challenge value and the application ID, and apply base64 encoding to the combination to obtain the client data object.

Further, the fourth generating module 306 is configured to combine the registering response information received by the first receiving module 303, the client data object, the application ID, and the session ID and the challenge value in the registering data received by the first receiving module 303 into the key registering request.

The client provided by the disclosed embodiment may be used specifically to implement the embodiment methods provided in FIG. 1 or 2 above, and the specific functions will not be repeated herein.

In this embodiment, an authenticating device participates in a process of identity authentication and stores a private key of a user therein, making it harder for cyber offenders to obtain the information. During the identity authentication, the private key will not be sent out, and after the identity has been authenticated successfully, the client will not keep any login information. Thus, rapid identity authentication is realized and security for Internet is improved.

Embodiment 4

Figure 5:
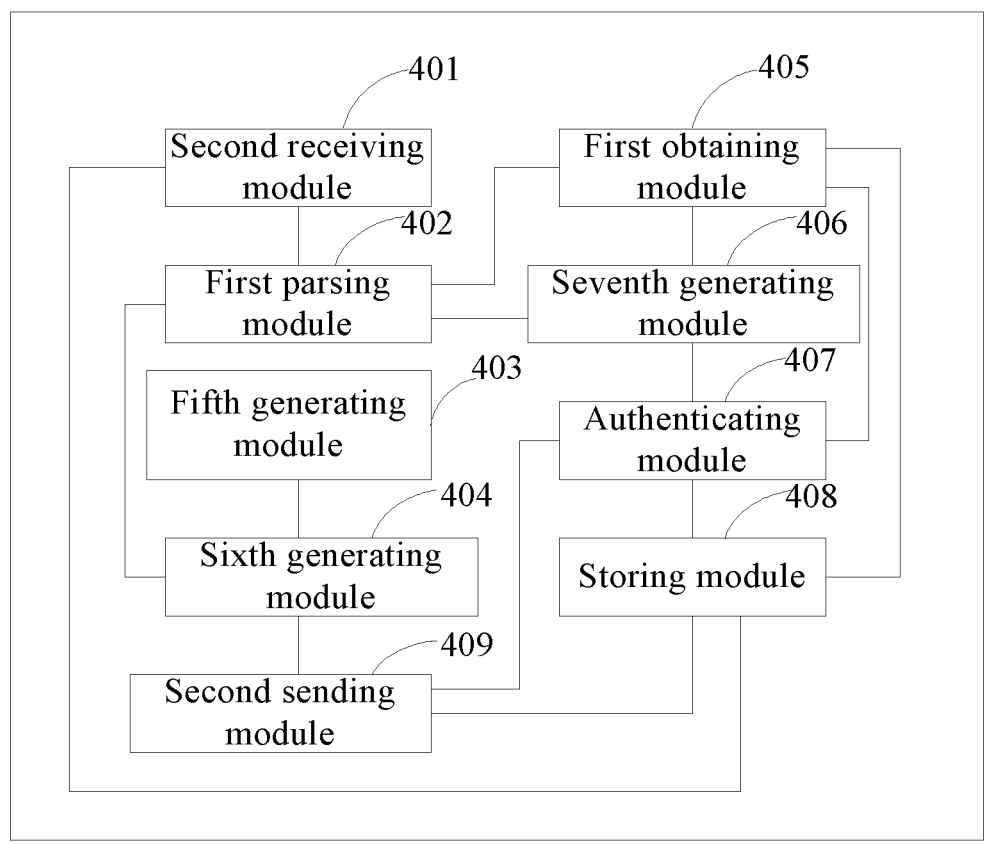
FIG. 5 is a structural diagram illustrating a server for registering based on an authenticating device and provided by Embodiment 4 of the present disclosure.

The Embodiment 4 provides a server for registering based on an authenticating device. FIG. 5 is a structural diagram illustrating a server for registering based on an authenticating device and provided by Embodiment 4 of the present disclosure. As shown in FIG. 5, the server includes: a second receiving module 401, a first parsing module 402, a fifth generating module 403, a sixth generating module 404, a first obtaining module 405, a seventh generating module 406, a verifying module 407, a storing module 408, and a second sending module 409.

The second receiving module 401 is configured to receive a device registering request sent by a client, and receive a key registering request sent by the client.

The first parsing module 402 is configured to parse the device registering request received by the second receiving module 401 to obtain an application ID, and parse the key registering request received by the second receiving module 401 to obtain a registering response information, a client data object, and a session ID.

The fifth generating module 403 is configured to generate a challenge value and the session ID.

The sixth generating module 404 is configured to combine the challenge value and the session ID generated by the fifth generating module 403, and the application ID obtained through the parsing by the first parsing module 402 into registering data.

The first obtaining module 405 is configured to obtain, from the registering response information obtained through parsing by the first parsing module 402, a public key in a key pair, a key identification, a certificate, and a signature result, which are generated by the authenticating device.

The seventh generating module 406 is configured to apply hash operation to the client data object obtained through parsing by the first parsing module 402 to obtain a first hash value, search for an application ID according to the session ID obtained through parsing by the first parsing module 402, apply hash operation to the application ID to obtain a second hash value, and compose verifying data according to the first hash value, the second hash value, the key identification and the public key in the key pair obtained through parsing by the first parsing module 405.

The verifying module 407 is configured to perform signature verification according to the verifying data generated by the seventh generating module 406, and the public key in the key pair and the signature result obtained by the first obtaining module 405, and determine whether the signature verification is successful.

The storing module 408 is configured to store the key identification, the public key in the key pair and the certificate obtained by the first obtaining module 405, and the user identification in the device registering request received by the second receiving module 401 as a key record when the verifying module 407 determines that the signature verification is successful.

The second sending module 409 is configured to send the registering information generated by the sixth generating module 404 to the client, and return error information to the client when the authentication module 407 determines that the signature verification is failed, or send success information to the client when the storing module 408 stores the key record.

Further, the first parsing module 402 is also configured to parse the device registering request to obtain the application identification.

The server further includes a second determining module and a third determining module.

The second determining module is configured to search for an application record in the server according to the application identification obtained through parsing by the first parsing module 402, and determine whether an application record matching the application identification can be found.

The third determining module is configured to, when the second determining module determines that an application record matching the application identification can be found, obtain the application record matching the application identification, obtain a protected address in the application record, determine whether the application ID obtained through parsing by the first parsing module 402 matches the obtained protected address and, if yes, trigger the fifth generating module 403 to operate.

The second sending module 409 is further configured to return error information to the client when the second determining module determines that an application record matching the application identification cannot be found, and/or when the third determining module determines that the application ID obtained through parsing by the first parsing module 402 does not match the obtained protected address.

Further, the first parsing module 402 is also configured to parse the device registering request to obtain the application ID and challenge value.

The server further includes a fourth determining module that is configured to search for the application ID and the challenge value in the server according to the session ID obtained through parsing by the first parsing module 402, determine whether the application ID and the challenge value found in the searching can be individually matched to the application ID and the challenge value obtained through parsing the key registering request by the first parsing module 402 and, if yes, trigger the first obtaining module 405 to operate.

The second sending module 409 is further configured to return error information to the client when the fourth determining module determines that the application ID and the challenge value found in the searching do not match the application ID and the challenge value obtained through parsing.

Further, the storing module 408 is further configured to store the key identification, the public key in the key pair and the certificate obtained by the first obtaining module 405, the user identification in the device registering request and received by the second receiving module 401, and the application ID found by the seventh generating module 406, as a key record when the verifying module 407 determines that the signature verification is successful.

The server provided by the disclosed embodiment may be used specifically to implement the embodiment methods provided in FIG. 1 or 2 above, and the specific functions will not be repeated herein.

In this embodiment, an authenticating device participates in a process of identity authentication and stores a private key of a user therein, making it harder for cyber offenders to obtain these information. During the identity authentication, the private key will not be sent out, and after the identity has been authenticated successfully, the client will not keep any login information. Thus, rapid identity authentication is realized and security for Internet is improved.

Embodiment 5

Figure 6:
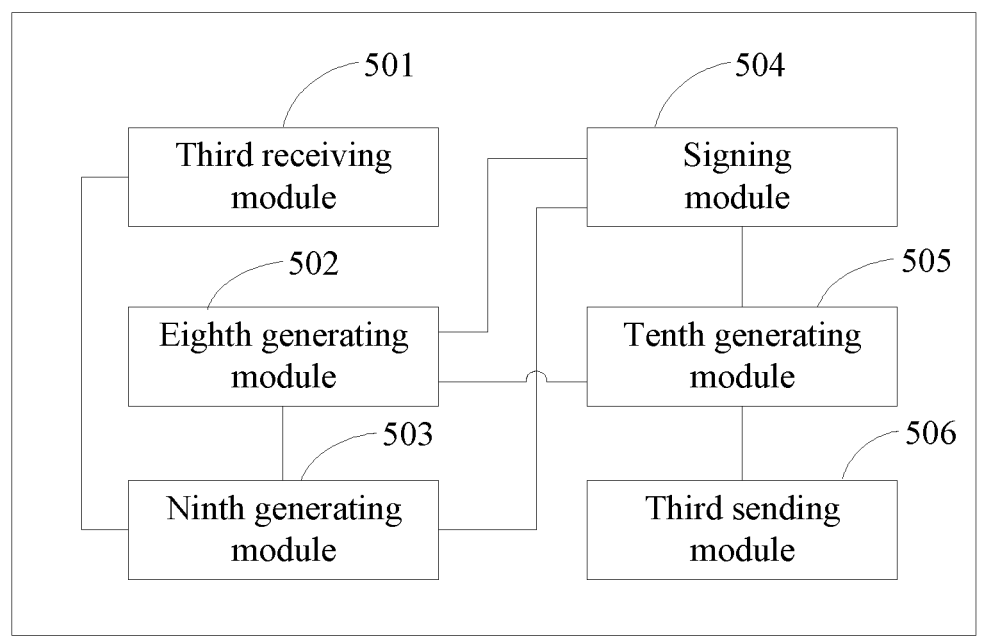
FIG. 6 is a structural diagram illustrating an authenticating device for registering based on the authenticating device and provided by Embodiment 5 of the present disclosure.

The Embodiment 5 provides an authenticating device for registering based on the authenticating device. FIG. 6 is a structural diagram illustrating an authenticating device for registering based on the authenticating device and provided by Embodiment 5 of the present disclosure. As shown in FIG. 6, the authenticating device includes: a third receiving module 501, an eighth generating module 502, a ninth generating module 503, a signing module 504, a tenth generating module 505, and a third sending module 506.

The third receiving module 501 is configured to receive registering request information sent by the client.

The eighth generating module 502 is configured to generate a key pair, a certificate, and a key identification.

The ninth generating module 503 is configured to obtain data to be signed according to a challenge parameter and an application parameter in the registering request information received by the third receiving module 501, and the key identification and a public key in the key pair generated by the eighth generating module 502.

The signing module 504 is configured to use a private key in the key pair generated by the eighth generating module 502 to sign the data to be signed and generated by the ninth generating module 503 according to a signature algorithm to obtain a signature result.

The tenth generating module 505 is configure to combine the public key, the length of the key identification, the key identification, the certificate generated by the eighth generating module 502, and the signature result obtained through signing by the signing module 504, into registering response information.

The third sending module 506 is configured to send the registering response information generated by the tenth generating module 505 to the client.

The authenticating device provided by the disclosed embodiment may be used specifically to implement the embodiment methods provided in FIG. 1 or 2 above, and the specific functions will not be repeated herein.

In this embodiment, an authenticating device participates in a process of identity authentication and stores a private key of a user in the authenticating device, making it harder for cyber offenders to obtain this information. During the identity authentication, the private key will not be sent out, and after the identity has been authenticated successfully, the client will not keep any login information. Thus, rapid identity authentication is realized and security for Internet is improved.

What is described above are merely some of the preferred specific implementations of, rather than limitation on the protection scope of, the present disclosure. Any and all variation and/or substitution readily conceivable by persons skilled in the art within the technical scope disclosed in the present disclosure shall fall within the protection scope of the present disclosure. Therefore, the protection scope of the present disclosure shall be subject to the appended claims.

What is claimed is:

1. A method for registering based on an authenticating device, comprising:
    Step S1: by a client, obtaining a uniform resource identifier, obtaining an application ID according to the uniform resource identifier, obtaining a device registering request according to the application ID and a user identification input by a user, and sending the device registering request to a server;
    Step S2: by the client, receiving registering data returned by the server, and obtaining a client data object according to a challenge value and the application ID in the registering data;
    Step S3: by the client, applying hash operation to the client data object to obtain a challenge parameter, applying hash operation to the application ID to obtain an application parameter, combining the challenge parameter and the application parameter into registering request information, and sending the registering request information to an authenticating device;
    Step S4: by the client, receiving registering response information returned by the authenticating device, combining the registering response information, the client data object and a session ID in the registering data into a key registering request, and sending the key registering request to the server; and
    Step S5: by the client, receiving information returned by the server, determining whether the received information is success information and, if yes, determining that the registering is successful, otherwise, determining that the registering is failed.

2. The method of claim 1, wherein after Step S1, the method further comprises:
    Step P1: parsing, by the server, the device registering request to obtain the application ID; and
    Step P2: by the server, generating the challenge value, and the session ID, combining the challenge value, the application ID, and the session ID into the registering data, and sending the registering data to the client.

3. The method of claim 2, wherein Step P1 further comprises:
    parsing, by the server, the device registering request to obtain an application identification;
    and before Step P2, the method further comprises:
    Step P1-1: by the server, searching for an application record in the server according to the application identification, determining whether an application record matching the application identification can be found and, if yes, executing Step P1-2, otherwise, returning error information to the client;
    Step P1-2: by the server, obtaining the application record matching the application identification, obtaining a protected address in the application record, determining whether the application ID obtained through the parsing can be matched to the protected address and, if yes, executing Step P2, otherwise, returning error information to the client.

4. The method of claim 1, wherein the obtaining the client data object according to the challenge value and the application ID in the registering data comprises:
    by the client, combining a first preset string, the challenge value, and the application ID, and applying base64 encoding to data obtained by the combining to obtain the client data object.

5. The method of claim 1, wherein after Step S3, the method further comprises:
    Step Q1: generating, by the authenticating device, a key pair, a certificate, and a key identification;
    Step Q2: obtaining, by the authenticating device, data to be signed according to the challenge parameter and the application parameter in the registering request information, the generated key identification, and a public key in the key pair;
    Step Q3: using, by the authenticating device, a private key in the generated key pair to sign the data to be signed according to a signature algorithm to obtain a signature result; and
    Step Q4: by the authenticating device, combining the public key in the key pair, length of the key identification, the key identification, the certificate, and the signature result into registering response information, and sending the registering response information to the client.

6. The method of claim 1, wherein after Step S4, the method further comprises:
    Step P3: parsing, by the server, the key registering request to obtain the registering response information, the client data object, and the session ID;
    Step P4: obtaining, by the server, the public key in the key pair, the key identification, the certificate, and the signature result from the registering response information, which are generated by the authenticating device;
    Step P5: by the server, applying hash operation to the client data object to obtain a first hash value, searching for an application ID according to the session ID, applying hash operation to the application ID to obtain a second hash value, and composing verifying data according to the first hash value, the second hash value, the obtained key identification, and the public key in the key pair;
    Step P6: by the server, performing signature verification according to the verifying data, the public key in the key pair, and the obtained signature result, determining whether the signature verification is successful and, if yes, executing Step P7, otherwise, returning error information to the client; and
    Step P7: by the server, storing the obtained key identification, the public key in the key pair, the certificate, and the user identification in the device registering request as a key record, and returning the success information to the client.

7. The method of claim 6, wherein Step S4 comprises:
    by the client, receiving the registering response information returned by the authenticating device, combining the registering response information, the client data object, the application ID, the session ID, and the challenge value in the registering data into the key registering request, and sending the key registering request to the server;

Step P3 further comprises:
parsing, by the server, the key registering request to obtain the application ID and the challenge value;
and before Step P4, the method further comprises:
by the server, searching for the application ID and the challenge value in the server according to the session ID, determining whether the application ID and the challenge value found in the searching can be individually matched to the received application ID and the challenge value and, if yes, executing Step P4, otherwise, returning error information to the client.

8. The method of claim 6, wherein after Step P7, the method further comprises:
storing, by the server, the application ID as the key record.

9. A client for registering based on an authenticating device, comprising: a first generating module, a first sending module, a first receiving module, a second generating module, a third generating module, a fourth generating module, and a first determining module, wherein
the first generating module is configured to obtain an application ID according to the uniform resource identifier, and obtain a device registering request according to the application ID and a user identification input by a user;
the first sending module is configured to send the device registering request generated by the first generating module to the server, send registering request information generated by the third generating module to the authenticating device, and send a key registering request generated by the fourth generating module to the server;
the first receiving module is configured to receive registering data returned by the server, receive registering response information returned by the authenticating device, and receive information returned by the server;
the second generating module is configured to obtain a client data object according to a challenge value and the application ID in the registering data received by the first receiving module;
the third generating module is configured to apply hash operation to the client data object generated by the second generating module to obtain a challenge parameter, apply hash operation to the application ID in the first generating module to obtain an application parameter, and combine the challenge parameter and the application parameter into registering request information;
the fourth generating module is configured to combine the registering response information received by the first receiving module, the client data object, and a session ID in the registering data received by the first receiving module into the key registering request; and
the first determining module is configured to determine whether the information received by the first receiving module is success information and, if yes, determining that the registering is successful, otherwise, determining that the registering is failed.

10. The client of claim 9, wherein the second generating module is configured to combine a first preset string, the challenge value and the application ID, and apply base64 encoding to the combination to obtain the client data object.

11. The client of claim 9, wherein the fourth generating module is configured to combine the registering response information received by the first receiving module, the client data object, the application ID, and the session ID and the challenge value in the registering data received by the first receiving module into the key registering request.

12. A server for registering based on an authenticating device, comprising: a second receiving module, a first parsing module, a fifth generating module, a sixth generating module, a first obtaining module, a seventh generating module, a verifying module, a storing module, and a second sending module, wherein
the second receiving module is configured to receive a device registering request sent by a client, and receive a key registering request sent by the client;
the first parsing module is configured to parse the device registering request received by the second receiving module to obtain an application ID, and parse the key registering request received by the second receiving module to obtain a registering response information, a client data object, and a session ID;
the fifth generating module is configured to generate a challenge value and the session ID;
the sixth generating module is configured to combine the challenge value and the session ID generated by the fifth generating module, and the application ID obtained through the parsing by the first parsing module into registering data;
the first obtaining module is configured to obtain, from the registering response information obtained through parsing by the first parsing module, a public key in a key pair, a key identification, a certificate, and a signature result, which are generated by the authenticating device;
the seventh generating module is configured to apply hash operation to the client data object obtained through parsing by the first parsing module to obtain a first hash value, search for an application ID according to the session ID obtained through parsing by the first parsing module, apply hash operation to the application ID to obtain a second hash value, and compose verifying data according to the first hash value, the second hash value, the key identification and the public key in the key pair obtained through parsing by the first parsing module;
the verifying module is configured to perform signature verification according to the verifying data generated by the seventh generating module, and the public key in the key pair and the signature result obtained by the first obtaining module, and determine whether the signature verification is successful;
the storing module is configured to store the key identification, the public key in the key pair and the certificate obtained by the first obtaining module, and the user identification in the device registering request received by the second receiving module as a key record when the verifying module determines that the signature verification is successful; and
the second sending module is configured to send the registering information generated by the sixth generating module to the client, and returns error information to the client when the authentication module determines that the signature verification is failed, or send success information to the client when the storing module stores the key record.

13. The server of claim 12, wherein the first parsing module is further configured to parse the device registering request to obtain the application identification;
and the server further comprises: a second determining module and a third determining module, wherein:
the second determining module is configured to search for an application record in the server according to the application identification obtained through parsing by the first parsing module, and determine whether an application record matching the application identification can be found;

the third determining module is configured to, when the second determining module determines that an application record matching the application identification can be found, obtain the application record matching the application identification, obtain a protected address in the application record, determine whether the application ID obtained through parsing by the first parsing module matches the obtained protected address and, if yes, trigger the fifth generating module to operate; and the second sending module is further configured to return error information to the client when the second determining module determines that an application record matching the application identification cannot be found, and/or when the third determining module determines that the application ID obtained through parsing by the first parsing module does not match the obtained protected address.

14. The server of claim 12, wherein the first parsing module is further configured to parse the key registering request to obtain the application ID and the challenge value; and the server further comprises: a fourth determining module, wherein the fourth determining module is configured to search for the application ID and the challenge value in the server according to the session ID obtained through parsing by the first parsing module, determine whether the application ID and the challenge value found in the searching can be individually matched to the application ID and the challenge value obtained through parsing the key registering request by the first parsing module and, if yes, trigger the first obtaining module to operate; and the second sending module is further configured to return error information to the client when the fourth determining module determines that the application ID and the challenge value found in the searching do not match the application ID and the challenge value obtained through parsing.

15. The server of claim 12, wherein the storing module is further configured to store the key identification, the public key in the key pair and the certificate obtained by the first obtaining module, the user identification in the device registering request and received by the second receiving module, and the application ID found by the seventh generating module, as a key record when the verifying module determines that the signature verification is successful.

16. An authenticating device for registering based on the authenticating device, comprising: a third receiving module, an eighth generating module, a ninth generating module, a signing module, a tenth generating module, and a third sending module, wherein the third receiving module is configured to receive registering request information sent by the client;

the eighth generating module is configured to generate a key pair, a certificate, and a key identification;

the ninth generating module is configured to obtain data to be signed according to a challenge parameter and an application parameter in the registering request information received by the third receiving module, and the key identification and a public key in the key pair generated by the eighth generating module;

the signing module is configured to use a private key in the key pair generated by the eighth generating module to sign the data to be signed and generated by the ninth generating module according to a signature algorithm to obtain a signature result;

the tenth generating module is configure to combine the public key, the length of the key identification, the key identification, the certificate generated by the eighth generating module, and the signature result obtained through signing by the signing module, into registering response information; and the third sending module is configured to send the registering response information generated by the tenth generating module to the client.

\* \* \* \* \*